(12) United States Patent
Lee et al.

(10) Patent No.: US 7,253,799 B2
(45) Date of Patent: Aug. 7, 2007

(54) BACKLIGHT USING PLANAR HOLOGRAM FOR FLAT DISPLAY DEVICE

(75) Inventors: Moon-Gyu Lee, Suwon-si (KR); Hwan-Young Choi, Anyang-si (KR); Jin-Seung Choi, Suwon-si (KR); Jee-Hong Min, Yongin-si (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 349 days.

(21) Appl. No.: 10/482,300

(22) PCT Filed: Jun. 27, 2002

(86) PCT No.: PCT/KR02/01232

§ 371 (c)(1),
(2), (4) Date: Jul. 28, 2004

(87) PCT Pub. No.: WO03/004931

PCT Pub. Date: Jan. 16, 2003

(65) Prior Publication Data

US 2004/0246743 A1    Dec. 9, 2004

(30) Foreign Application Priority Data

Jun. 30, 2001   (KR)   ................. 2001-38807
Apr. 26, 2002   (KR)   ................. 2002-23114

(51) Int. Cl.
*G09G 3/36*      (2006.01)

(52) U.S. Cl. .............. 345/102; 345/103; 345/104; 345/87; 345/89

(58) Field of Classification Search ........ 345/102–105, 345/211–214, 87–89, 7–9, 173; 348/333.01; 349/31, 62, 65, 64, 112, 71, 146; 362/26, 362/31, 555, 558, 561; 359/15, 22, 53, 291, 359/292, 237; 353/20; 356/497
See application file for complete search history.

(56) References Cited

U.S. PATENT DOCUMENTS 4,989,956 A * 2/1991 Wu et al. .................. 349/71

(Continued)

FOREIGN PATENT DOCUMENTS

JP          07-020321 A      1/1995

(Continued)

*Primary Examiner*—Bipin Shalwala
*Assistant Examiner*—Prabodh Dharia
(74) *Attorney, Agent, or Firm*—Sughrue Mion, PLLC

(57) ABSTRACT

The backlight for a flat display device including a light source, a light guide plate and a surface hologram is provided. The light guide plate is installed at one side of the light source, and light from the light source travels in the light guide plate while being totally reflected. The surface hologram is formed on at least one surface of the light guide plate. The surface hologram has a pattern of a predetermined grating interval and a predetermined grating depth in order to diffract light at a predetermined angle toward the light guide plate.

18 Claims, 14 Drawing Sheets

U.S. PATENT DOCUMENTS

| | | | | |
|---|---|---|---|---|
| 5,046,827 A * | 9/1991 | Frost et al. | ............... | 349/112 |
| 5,319,491 A * | 6/1994 | Selbrede | ............... | 359/291 |
| 5,506,701 A * | 4/1996 | Ichikawa | ............... | 359/15 |
| 5,703,667 A * | 12/1997 | Ochiai | ............... | 349/65 |
| 6,011,602 A * | 1/2000 | Miyashita et al. | ............... | 349/65 |
| 6,020,944 A * | 2/2000 | Hoshi | ............... | 349/62 |
| 6,195,196 B1 * | 2/2001 | Kimura et al. | ............... | 359/295 |
| 6,196,691 B1 * | 3/2001 | Ochiai | ............... | 362/617 |
| 6,375,327 B2 * | 4/2002 | Holman et al. | ............... | 353/20 |
| 6,454,452 B1 * | 9/2002 | Sasagawa et al. | ............... | 362/561 |
| 6,456,279 B1 * | 9/2002 | Kubo et al. | ............... | 345/173 |
| 6,583,915 B1 * | 6/2003 | Hong et al. | ............... | 359/237 |
| 6,639,642 B1 * | 10/2003 | Suzuki et al. | ............... | 349/146 |
| 6,771,331 B1 * | 8/2004 | Kubota et al. | ............... | 349/62 |
| 7,133,138 B2 * | 11/2006 | Horii et al. | ............... | 356/497 |
| 2001/0012159 A1 * | 8/2001 | Umemoto et al. | ............... | 359/599 |
| 2003/0043122 A1 * | 3/2003 | Suzuki | ............... | 345/173 |

FOREIGN PATENT DOCUMENTS

| | | |
|---|---|---|
| JP | 08-43819 A | 2/1996 |
| JP | 08-122534 A | 5/1996 |
| JP | 11-174443 A | 7/1999 |
| JP | 11-232918 A | 8/1999 |
| KR | 2001-8540 A | 2/2001 |
| KR | 2001-47793 A | 6/2001 |

* cited by examiner

BACKLIGHT USING PLANAR HOLOGRAM FOR FLAT DISPLAY DEVICE

BACKGROUND OF THE INVENTION

This application claims the priorities of Korean Patent Application Nos. 2001-38807 and 2002-23114, filed on Jun. 30, 2001 and Apr. 26, 2002, respectively, in the Korean Intellectual Property Office, the disclosures of which are incorporated herein in their entireties by reference.

FIELD OF THE INVENTION

The present invention relates to the field of backlights for flat display devices, and more particularly, to a backlight for a flat display device including a light path changing unit, which makes already incident light again incident upon a planar hologram at an angle providing the maximum diffraction efficiency, and a light guide plate including the planar hologram.

DESCRIPTION OF THE RELATED ART

Referring to FIG. 1, a conventional backlight includes a light source 11, a light guide plate 13, a diffusion plate 19 and prismatic plates 21a and 21b. The light guide plate 13 directs light emitted from the light source 11, the diffusion plate 19 diffuses light directed by the light guide plate 13, and the prismatic plates 21a and 21b collect diffused light on their respective front sides.

Referring to FIG. 2, in a conventional backlight, light emitted from the light source 11 is incident upon the light guide plate 13 and further transmitted by total reflection. Some of the light passes through the bottom surface of the light guide plate 13, is reflected by a reflection plate 17 and reenters the light guide plate 13.

A light scattering pattern 23, which is a dot pattern, is printed on the bottom surface of the light guide plate 13. From light incident upon the light guide plate 13, only light not reflected due to scattering by the light scattering pattern 23 penetrates through the upper surface of the light guide plate 13.

To improve light uniformity, the diffusion plate 19, which covers the entire surface of the light guide plate 13, diffuses the light emitted from the light guide plate 13.

The prismatic plates 21a and 21b are provided on the entire surface of the diffusion plate 19. Each of the prismatic plates 21a and 21b is formed of a plurality of prism strips with triangular cross sections. When two prismatic plates are used together, as in the case of the prismatic plates 21a and 21b, they are disposed so that the prismatic strips of the prismatic plate 21a make a right angle with the prismatic strips of the prismatic plate 21b. The prismatic plates 21a and 21b increase the front luminance of light by refracting or totally reflecting light emitted from the diffusion plate 19 depending on the angle at which light is incident upon the prismatic plates 21a and 21b.

A protection plate 25 is installed on the front side of the prismatic plate 21a to protect the entire system of backlight.

In such a conventional backlight, in order to emit light from the light guide plate 13, a dot pattern for light scattering is formed on the bottom surface of the light guide plate 13, or the light guide plate 13 has a prismatic or sinusoidal bottom surface. However, manufacturing of a prismatic or sinusoidal pattern on the light guide plate 13 requires a special and expensive equipment and a time-consuming process.

The dot pattern printed on the bottom surface of the light guide plate 13 makes spots appear on the screen when it is combined with a liquid crystal panel, thus degrading image quality. A diffusion plate adopted to solve this problem reduces the light reflection efficiency by 20% to 30% depending on the transmission performance. As the light efficiency of the light guide plate 13 depends on the position and area of its dot pattern, it may be further reduced according to the position and area of the dot pattern.

In a conventional backlight, light emitted from the light source 11 is scattered by a dot pattern for light scattering or prism-shaped grooves formed on the bottom surface of the light guide plate 13, and then emitted at an angle of 70° to 90° with respect to a normal line perpendicular to the light guide plate 13. A diffusion plate and a prismatic plate are further required to convert the direction of such light emitted at a large angle into the normal direction of the light guide plate 13. As a result, the assembling process of a backlight is complicated, and the manufacturing costs thereof increase.

FIGS. 3A through 3E are graphs showing a variation in the distribution of light intensity for a conventional backlight. FIG. 3A shows the light intensity distribution of light emitted from the light guide plate 13 of FIG. 2. Referring to FIG. 3A, the light intensity distribution of light emitted from the light guide plate 13 has an asymmetrical structure where the highest light intensity is obtained around 90°. That is, the light intensity around 90° is about 3,400 cd (where cd denotes the base unit of light intensity, i.e., candela), and a light intensity of 400 cd or less appears between 0° and 180°.

The asymmetrical light intensity distribution of FIG. 3A changes into a symmetrical light intensity distribution in which the light intensity of the center portion of a conventional backlight becomes stronger, as shown in FIGS. 3B to 3E.

FIG. 3B shows the light intensity distribution of light emitted from the light guide plate 13 and the diffusion plate 19. Referring to FIG. 3B, an asymmetrical distribution is still shown where a portion with the highest light intensity of about 800 cd appears on the upper half vertical axis and the light intensity becomes weaker from the center of the conventional backlight toward the periphery thereof.

FIG. 3C shows the light intensity distribution of light transmitted by the light guide plate 13, the diffusion plate 19 and the first prismatic plate 21b. Referring to FIG. 3C, the highest light intensity of about 940 cd appears around the center of the conventional backlight. The light intensity distribution of FIG. 3C is symmetrical in contrast with the light intensity distribution of FIG. 3B.

FIG. 3D shows the light intensity distribution of light transmitted by the light guide plate 13, the diffusion plate 19 and the first and second prismatic plates 21b and 21a. The light intensity distribution of FIG. 3D has a similar shape to that of FIG. 3C rotated by 90°. The light intensity at the center of the conventional backlight is about 1,220 cd, and the distribution of light intensity is symmetrical.

FIG. 3E shows the distribution of the final light intensity of the conventional backlight. Referring to FIG. 3E, the light intensity at the center of the conventional backlight is about 1,100 cd, and the distribution of the final light intensity is symmetrical.

Conventional backlights must include a prismatic plate in order to obtain such a symmetrical light intensity distribution as shown in FIG. 3E. This leads to complicated, expensive backlights.

As described above, in the prior art, an additional device is required to compensate for the large emission angle of light emitted from a light guide plate. This causes an increase in the manufacturing costs of backlights.

SUMMARY OF THE INVENTION

To solve the above-described problems, it is an object of the present invention to provide a backlight for a flat display device capable of reducing light loss, which is generated while light is passing through a diffusion plate and a prismatic plate so that light is output from a light guide plate at an angle of 90° or at a predetermined angle near 90° with respect to the plane of the light guide plate, or to provide a no plastic plate backlight for a flat display device.

Another object of the present invention is to provide a backlight for a flat display device capable of using specific polarized light depending on the specific wavelength of light emitted from a light source.

Still another object of the present invention is to provide a backlight for a flat display device capable of compensating for the inverse proportional relationship between the diffraction efficiency and light intensity of a light guide plate on which a diffraction grating pattern is formed, both the diffraction efficiency and the light intensity depending on the incidence angle.

In order to achieve the above objects of the present invention, there is provided a backlight for a flat display device including a light source, a light guide plate and a surface hologram. The light guide plate is installed at one side of the light source. In the light guide plate, light from the light source travels while being totally reflected. The surface hologram is formed on at least one surface of the light guide plate. The surface hologram diffracts and emits the light at a predetermined angle to the plane of the light guide plate.

Preferably, the backlight for a flat display device further includes a light path changing unit installed at one side of the light guide plate. The light path changing unit changes the path of light traveling in the light guide plate to make light incident upon the planar hologram at an angle near the angle providing the maximum diffraction efficiency.

The backlight for a flat display device can further include a reflecting plate installed on the rear side of the light guide plate. The reflecting plate reflects light diffracted by the planar hologram and sends the diffracted light back to the light guide plate.

The light path changing unit is a reflective mirror that is located opposite to the light source and inclined at a predetermined angle. Alternatively, the light path changing unit is a reflective surface of the light guide plate, the reflective surface being located opposite to the light source and inclined at a predetermined angle. Still alternatively, the light path changing unit is a refracting element installed between the light source and the light guide plate or installed opposite to the side of the light guide plate where the light source is installed.

Here, the refracting element is either a refractive lens or a refractive grating.

Preferably, the diffraction efficiency of the planar hologram becomes lower toward either the light source or the light path changing unit.

Preferably, the pattern of the planar hologram becomes smaller toward either the light source or the light path changing unit.

It is preferable that the grating interval of the planar hologram is 2 µm or less.

In order to diffract incident beams into optimal states, the grating interval of the planar hologram can be composed of at least two types of grating intervals depending on the wavelength of light.

As for the surface hologram, the grating depth can be set so that the polarization of light output from the light guide plate after being diffracted by the surface hologram is superior to the direction of specific polarized light. Accordingly, it is preferable that the grating depth of the surface hologram is set so that the diffraction efficiency of a specific polarized light beam is 1.5 times as large as or greater than that of the other polarized light that meets the specific polarized light beam at a right angle.

Preferably, the backlight for a flat display device further includes a diffusion plate installed on the entire surface of the light guide plate to diffuse light emitted from the light guide plate.

When a white light source is used, the diffusion can reduce the degree of color separation of light caused by the difference in diffraction angle between light wavelengths.

In the present invention, a light path changing unit can increase the output amount of light by changing the path of high intensity light incident at an angle near 90°, so that the incident light is again incident upon the surface hologram at an angle guaranteeing the maximum diffraction efficiency.

Also, the planar hologram formed on the light guide plate enables light incident upon the light guide plate to be output from the light guide plate at an angle nearly perpendicular to the light guide plate. Accordingly, an efficient backlight having a simple structure having no prismatic plates can be provided.

In addition, the diffraction efficiency of a specific polarized light beam is rendered greatly higher than that of other polarized light beams by controlling the grating interval and depth of the surface hologram. Thus, the specific polarized light beam of light emitted from the light guide plate becomes excellent. Finally, the backlight according to the present invention can increase the light efficiency using polarization. As a result, a backlight using specific polarization can be manufactured.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
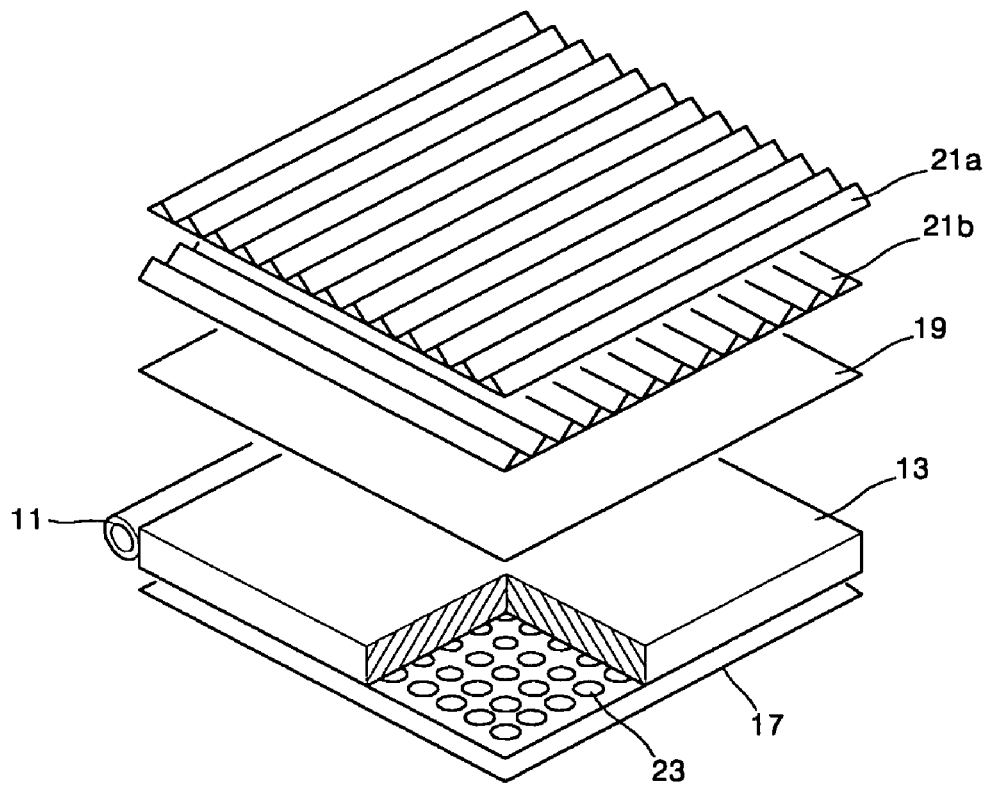
FIG. 1 is a schematic perspective view of a conventional backlight.
Figure 2:
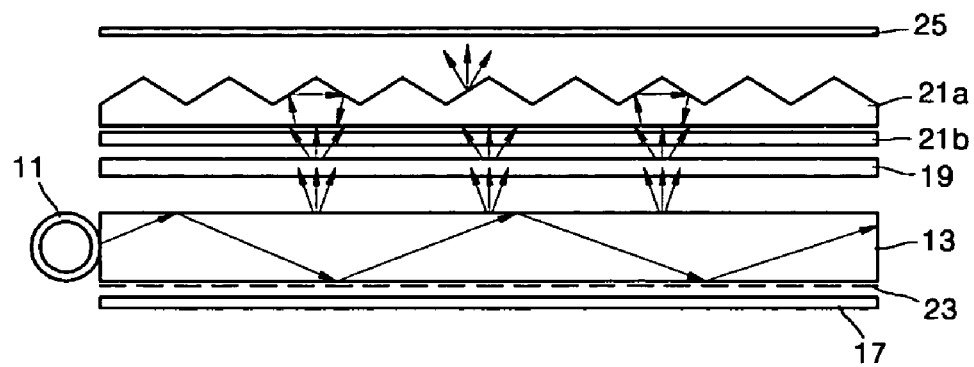
FIG. 2 is a cross-section of a conventional backlight.
Figure 3A:
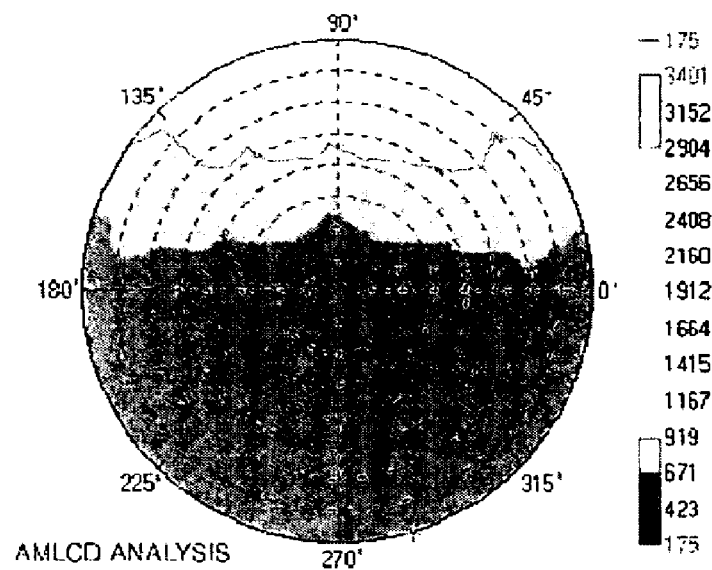
FIG. 3A shows the light intensity distribution of light transmitted by a light guide plate in a conventional backlight.
Figure 3B:
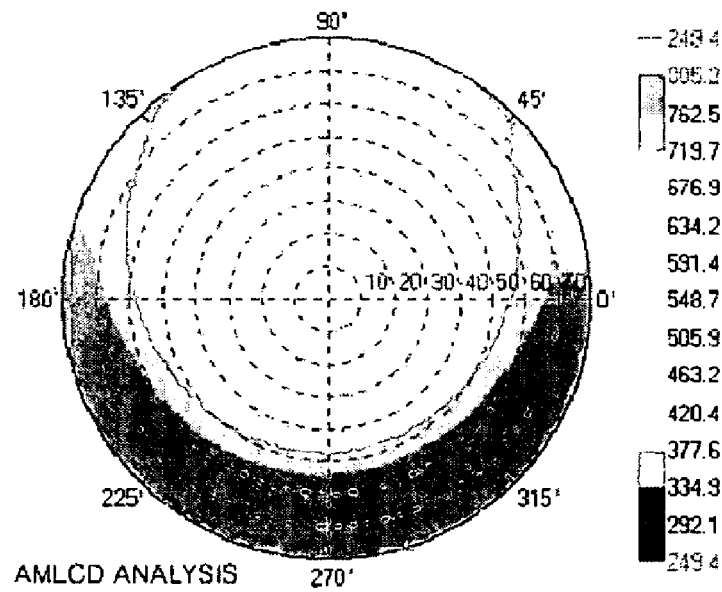
FIG. 3B shows the light intensity distribution of light transmitted by a diffusion plate in a conventional backlight.
Figure 3C:
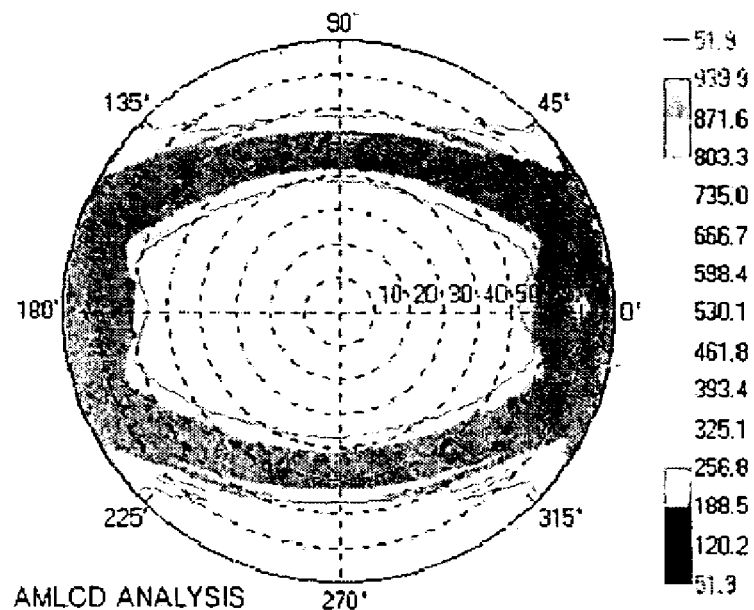
FIG. 3C shows the light intensity distribution of light transmitted by a first prismatic plate in a conventional backlight.
Figure 3D:
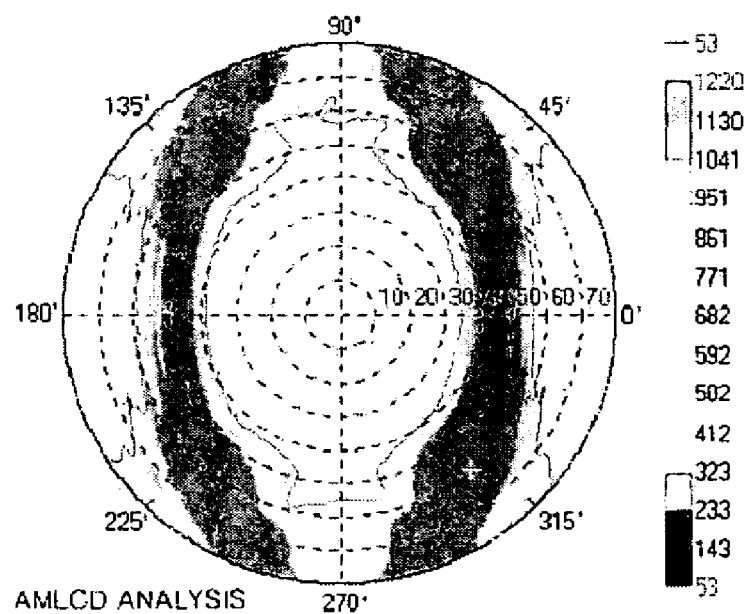
FIG. 3D shows the light intensity distribution of light transmitted by a second prismatic plate in a conventional backlight.
Figure 3E:
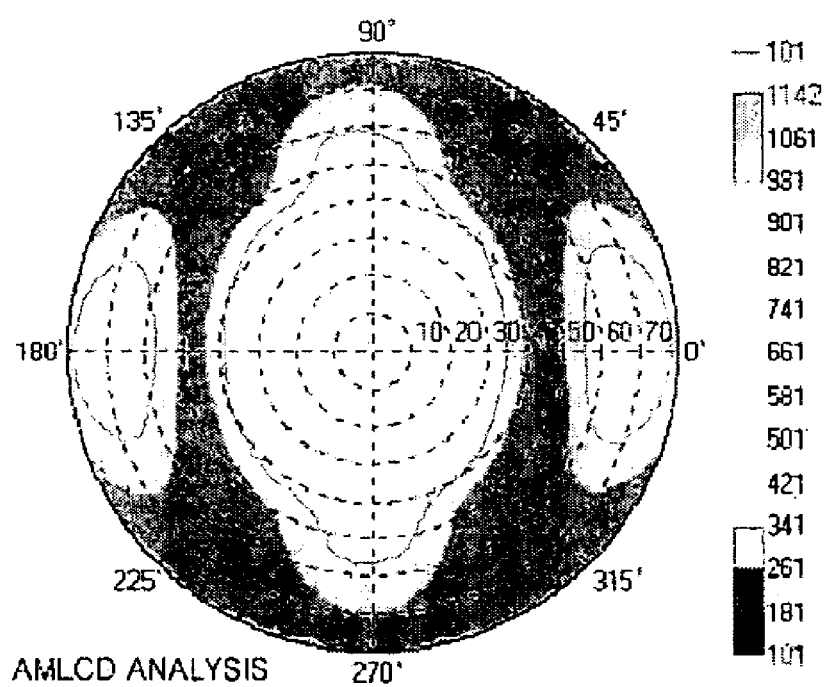
FIG. 3E shows the light intensity distribution of final light in a conventional backlight.
Figure 4A:
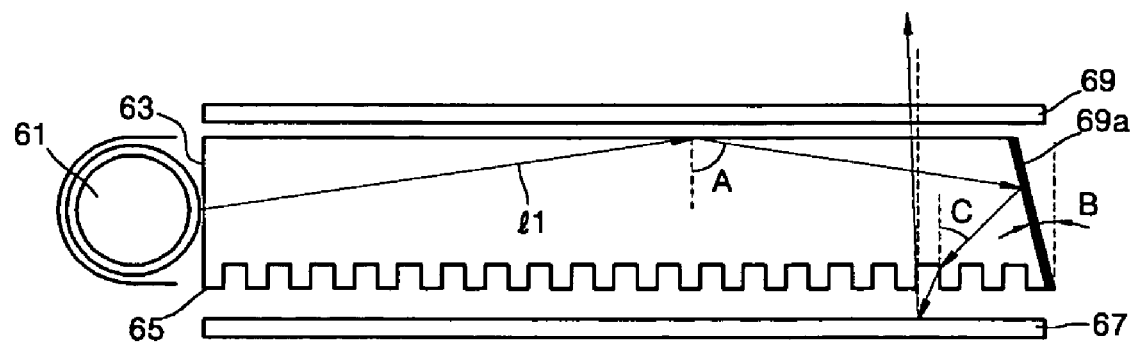
FIG. 4A is a schematic cross-section of a backlight according to a first embodiment of the present invention.

FIGS. 4A through 6B show backlights for a flat display device according to the first through sixth embodiments of the present invention, respectively, the backlights having a light path changing unit. In FIGS. 4A and 4B, the light path changing unit is a slant reflection plane formed on the side of a light guide plate.

Referring to FIG. 4A, a backlight for a flat display device according to a first embodiment of the present invention includes a light source 61, a light guide plate 63, a reflection plane 69a, a planar hologram 65 and a reflection plate 67. The light source 61 emits light 11. The light guide plate 63 directs the light 11 emitted from the light source 61 by totally reflecting the light 11. The reflection plane 69a is used as a light path changing unit for changing the path of the light 11. The planar hologram 65 diffracts light to output light at an angle of no less than 80° or at a predetermined design angle with respect to the plane of the light guide plate 63. The reflection plate 67 is positioned at the bottom surface of the planar hologram 65, reflects light diffracted by the planar hologram 65, and sends reflected light back to the light guide plate 63.

The light source 61 can be one of a laser diode (LD), a light emitting device (LED) and a cold cathode fluorescent lamp (CCFL). As described above, the planar hologram 65 is used in the present invention.

Generally, holograms can be classified into surface holograms and volume holograms. In volume holograms, an image is recorded within a hologram material. In surface holograms, an image is recorded on its surface. Consequently, a surface hologram can be mass-produced through duplication, but usually provides low diffraction efficiency. However, when a hologram with a grating interval having a similar length to the wavelength of light is formed on a light guide plate, light is not scattered in many directions due to the small number of diffraction orders capable of being transmitted. This case can overcome low diffraction efficiency.

A backlight for a flat display device according to the present invention reduces the, dependency upon the diffraction angle of reproduced light using a planar hologram and also compensates for the defects of the planar hologram by increasing the diffraction efficiency by introducing a light path changing unit.

In the backlight for a flat display device of FIG. 4A, the light 11 emitted from the light source 61 is incident upon the light guide plate 63 at an angle where total reflection can be achieved with respect to the plane of the light guide plate, and travels through total reflections. Here, light intensity increases as an initial incidence angle A approaches 90°, and the diffraction efficiency with respect to the planar hologram 65 is highest at an incidence angle C ranging between 40° and 60°. Accordingly, the initial incidence angle A of light is set at an angle between the total reflection angle Θ and 90°. The incidence angle C is set to an angle where the refraction efficiency with respect to the planar hologram 65 is the highest, by controlling the slant angle of the reflection plane 69a.

The total reflection angle can be obtained through the Snell's law. Since the refractive index (n) of the light guide plate 63 is usually about 1.5, the total reflection angle Θ for totally reflecting the light 11 within the light guide plate 63 can be obtained from Expression 1:

$$a\sin\left(\frac{1}{n}\right) - a\sin\left(\frac{1}{1.5}\right) - 41.8° \quad (1)$$

When the incidence angle A of the light 11 ranges from the total reflection angle Θ to 90° and the angle for the highest diffraction efficiency is 40°, the incidence angle C with respect to the planar hologram 65 is obtained from Equation 2:

$$C = A - 2B \quad (2)$$

The inclination B of the reflection plane 69a ranges from 0.9° to 25° according to Expression 3:

$$0.9 - \frac{41.8 - 40}{2} < B - \frac{A-C}{2} < \frac{90-40}{2} - 25 \quad (3)$$

Since the light amount increases as the incidence angle A approaches 90°, in order to maximally diffract light having an incidence angle A close to 90°, for example, an 85° incidence angle A, a 17.5° inclination angle B for a reflection plane can be obtained by substituting 85° for the initial incidence angle A in Equation 2 and 50° for the incidence angle C in Equation 2. The incidence angle of light upon the planar hologram 65, which provides the maximum diffraction efficiency, can be properly controlled according to the pattern of the planar hologram 65 because it depends on grating depths and grating intervals.

If light is incident upon the planar hologram 65 at an incidence angle C close to the incidence angle providing the maximum diffraction efficiency, light diffracted by the planar hologram 65 is reflected by the reflection plate 67 and penetrates through the planar hologram 65. Some of the light transmitted by the planar hologram 65 re-enters the light guide plate 63, and the rest is output through the light guide plate 63. Here, the output angle of light is set to an angle of 80° or more by controlling the grating interval and the grating depth. This will be described in detail when a backlight according another embodiment of the present invention having no light path changing units is described. In some cases, the angle at which light is output can be controlled by adjusting the grating interval.

Figure 4B:
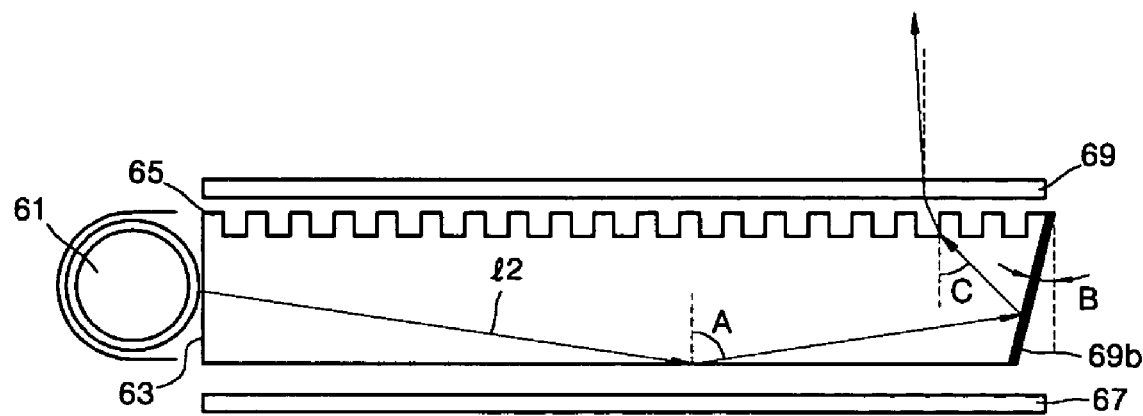
FIG. 4B is a schematic cross-section of a backlight according to a second embodiment of the present invention.

FIG. 4B shows a backlight according to a second embodiment of the present invention. Unlike the backlight for a flat display device according to the first embodiment of the present invention of FIG. 4A, the planar hologram 65 is formed on the upper side of the light guide plate 63. In addition, a reflection plane 69b is inclined in the opposite direction to the reflection plane 69a of FIG. 4A, so that the incidence angle C with respect to the plane of the planar hologram 65 approaches the incidence angle providing the maximum diffraction efficiency. However, as long as the incidence angle C satisfies the total reflection angle, the reflection plane 69b may not be inclined in the opposite direction to the reflection plane 69a of FIG. 4A. If a hologram pattern is formed on the upper surface of a light guide plate, like in this embodiment, a reflection sheet 67 may not be included.

As described above, a maximum output light amount is extracted by making light with high light intensity incident upon the planar hologram 65, which is formed on the upper surface of the light guide plate 63, at an angle close to the angle providing the maximum diffraction efficiency.

Figure 5A:
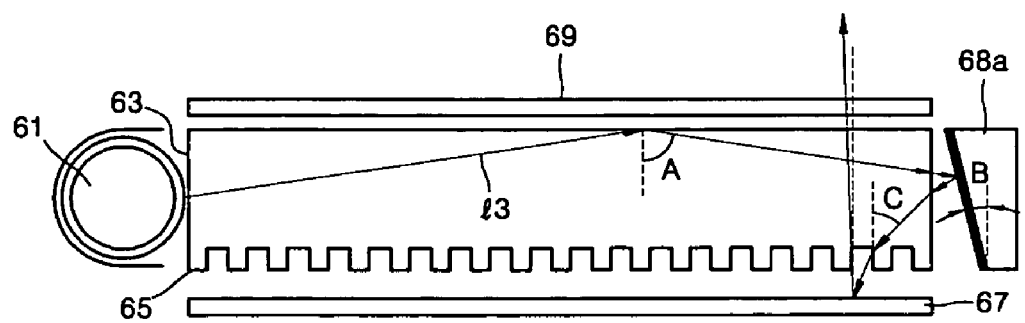
FIG. 5A is a schematic cross-section of a backlight according to a third embodiment of the present invention.
Figure 5B:
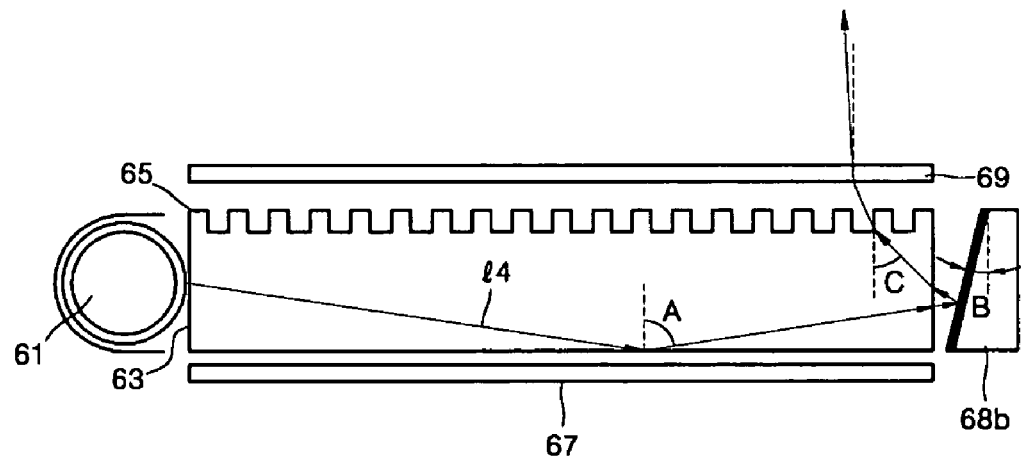
FIG. 5B is a schematic cross-section of a backlight according to a fourth embodiment of the present invention.

Backlights of FIGS. 5A and 5B adopt reflection mirrors 68a and 68b, respectively, instead of the reflection planes 69a and 69b of the backlights according to the first and second embodiments of the present invention. FIG. 5A shows a backlight for a flat display device according to a third embodiment of the present invention.

Referring to FIG. 5A, light #3 is incident upon the upper side of the light guide plate 63 at an incidence angle A. The incident light 13 passes through the light guide plate 63 and is then reflected by the reflection mirror 68a. The reflected light 13 re-enters into the light guide plate 63 and is then incident upon the planar hologram 65 at an incidence angle C. As described above, when the incidence angle A is close to 90°, the light intensity of the light 13 is the highest. The light 13 is incident upon the planar hologram 65 at the incidence angle C close to the angle providing the maximum diffraction efficiency.

FIG. 5B shows a backlight according to a fourth embodiment of the present invention. Referring to FIG. 5B, the light guide plate 63 has the planar hologram 65 formed on its upper side. In order to change the incidence angle of light 14 upon the planar hologram 65, the inclination angle B of the reflection mirror 68b is set in the same way as the inclination angle B of the reflection mirror 68a for the backlight of FIG. 5A.

Figure 6A:
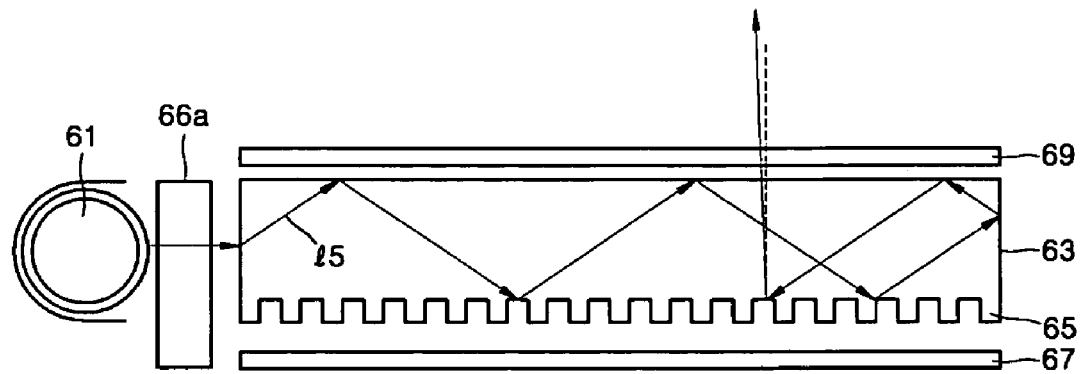
FIG. 6A is a schematic cross-section of a backlight according to a fifth embodiment of the present invention.

FIG. 6A shows a backlight according to a fifth embodiment of the present invention. Referring to FIG. 6A, a diffraction grating 66a is included as a light path changing unit between the light source 61 and the light guide plate 63. The diffraction grating 66a changes the path of light 15 incident upon the plane of the light guide plate 63 at an angle close to 90°, so that the light 15 travels to be incident upon the planar hologram 65 at an angle close to the incidence angle providing the maximum diffraction efficiency. The incidence angle C with respect to the planar hologram 65 has a range as described above, and the angle for the maximum diffraction efficiency may vary within the range of the incidence angle C, depending on grating depths and grating intervals. Here, the diffraction grating 66a can be replaced by a refraction lens.

Figure 6B:
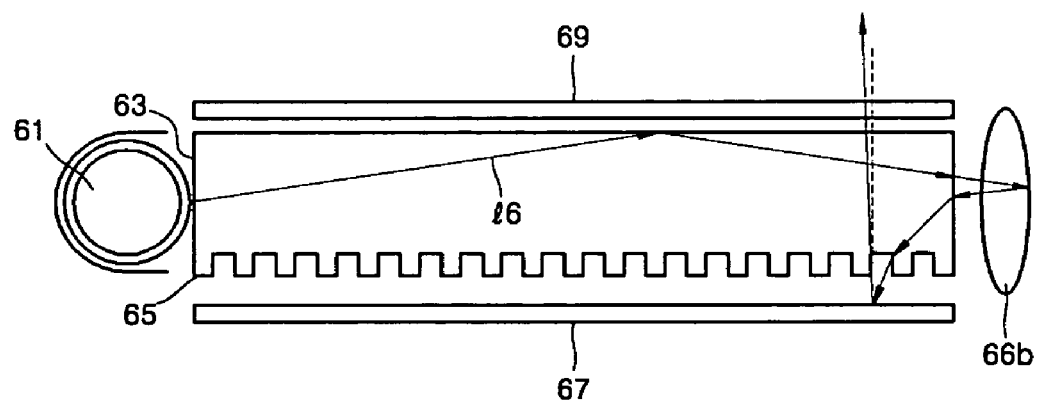
FIG. 6B is a schematic cross-section of a backlight according to a sixth embodiment of the present invention.

FIG. 6B schematically shows a backlight for a flat display device according to a sixth embodiment of the present invention. Referring to FIG. 6B, a refraction lens 66b is located opposite the light source 61, and has a reflective right side. Light 16 is reflected by the reflective right side and sent back to the light guide plate 63. The reflected light is incident upon the planar hologram 65 at an angle C close to the angle for the maximum diffraction efficiency. The range of the angle C is the same as described above.

The backlights for a flat display device according to the first through sixth embodiments of the present invention are just examples of the present invention. Other types of light path changing units can be used if they can change the path of light and make light incident upon a planar hologram at an angle close to the incidence angle for the maximum diffraction efficiency. The new light path changing units used can be installed between the light source 61 and the light guide plate 63, by being formed on one side of the light guide plate 63, or by being installed opposite the light source 61.

In addition, in the backlights for a flat display device according to the first through sixth embodiments of the present invention, a planar hologram 65 with a pattern to be described later is formed on one side of the light guide plate 63. That is, a planar hologram 65 with a pattern providing low diffraction efficiency or a small pattern is formed at the position having a high light intensity, so that the output amount of polarized light can be maximized and the output light can be uniformly distributed. The output light can be further uniformly distributed by adding a diffusion plate over the light guide plate 63.

Figure 7:
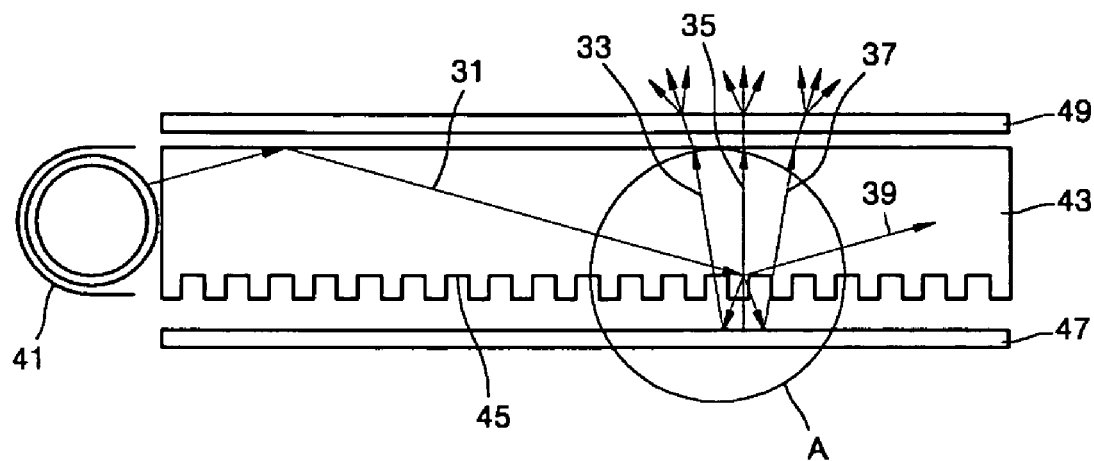
FIG. 7 is a schematic cross-section of a flat backlight having no light path changing units, according to an embodiment of the present invention.

FIG. 7 schematically shows a flat backlight with no light path changing units, according to the present invention. The flat backlight of FIG. 7 includes a light guide plate 43, a light source 41, a reflecting plate 47, and a planar hologram 45. The light source 41 is installed on one side of the light guide plate 43, the reflecting plate 47 is installed under the light guide plate 43, and the planar hologram 45 is formed on the bottom surface of the light guide plate 43.

A diffusion plate 49 is further installed over the light guide plate 43. A protection plate (not shown) can be further installed over the diffusion plate 49. The planar hologram 45 can be also formed on the upper surface of the light guide plate 43.

Light 31, white light emitted from the light source 41 to the plastic light guide plate 43, travels while being totally reflected within the light guide plate 43. The light 31 continuously remains within the light guide plate 43 as long as it satisfies the total reflection conditions. The light 31 is diffracted by the planar hologram 45 formed on the bottom surface of the light guide plate 43. First-order light beams 33, 35 and 37, from the diffracted light beams, are reflected by the reflecting plate 47 and sent back to the light guide plate 43. The reflected first-order light beams 33, 35 and 37 are output from the light guide plate 43 at angles nearly perpendicular to the plane of the plastic guide 43, that is, at angles of 80° or more. Meanwhile, a zero order light beam 39 is again reflected by the planar hologram 45 because it satisfies the total reflection conditions.

Most light is incident at an angle of 80° or more because the light guide plate 43 is long and narrow. Hence, when green light with a wavelength (λ) of 540 nm is incident at an angle (θ) of 80°, first order diffracted light is emitted vertically by satisfying Expression 4:

$$P = \frac{\lambda}{n \times \sin\theta} = \frac{540}{1.5 \times \sin 80°} = 365 \text{ nm} \quad (4)$$

wherein P denotes the grating interval, which is formed on a planar hologram.

As shown in Equation 4, when green light is incident at 80° and the grating interval P of the planar hologram 45 is about 365 nm, it is emitted nearly perpendicularly to the light guide plate. When light is incident at a different angle than 80° or light having a different wavelength than green light is incident, the grating interval P of the planar hologram 45 is changed to vertically emit the incident light. In all of these cases, when the grating interval of the planar hologram 45 is about 2 μm or less, light is uniformly emitted from the light guide plate 43 at a certain angle.

In the backlight of FIG. 7, light emitted from the light guide plate 43 makes an angle of almost 90° to the plane of the light guide plate 43, that is, an angle of 80° or more. Accordingly, the backlight of FIG. 7 does not require a prismatic plate, which is used in conventional backlights to obtain a high luminous efficiency. This simplifies the structure of a backlight, so that the backlight can be easily manufactured. Even when there is no need to emit light at an angle of almost 90°, light can be emitted at a certain angle by controlling the grating interval.

Figure 8:
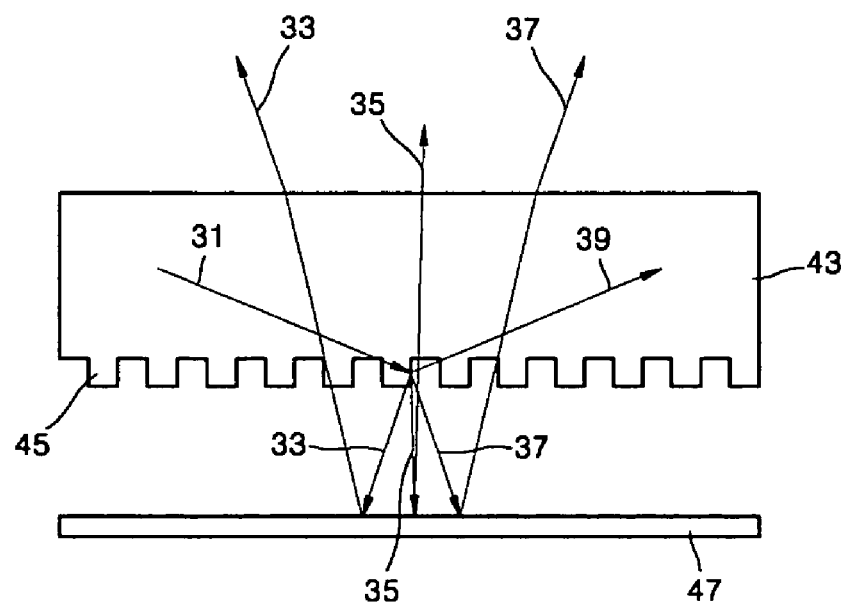
FIG. 8 is an enlarged cross-section of a portion indicated by reference character A of FIG. 7.

FIG. 8 is an enlarged cross-section of a portion indicated by reference character A of FIG. 7, showing the path of travel of incident light 31 diffracted by the planar hologram 45. Referring to FIG. 8, zero order light 39 from the incident light 31 is reflected by the interface at the hologram 45 formed on the bottom surface of the reflecting plate 47, while first-order diffracted light beams 33, 35 and 37 are diffracted by the hologram 45. That is, the first-order diffracted light beam 35, which is green, is diffracted at an angle of almost 90° to the plane of the light guide plate 43, while the first order light beams 33 and 37, which are red and blue, respectively, are diffracted at an angle larger than the diffraction angle of the green light beam 35. First-order diffracted light beams 33, 35 and 37 are reflected by the reflection plate 47 and sent back to the light guide plate 43 at an angle smaller than the total reflection angle. The first-order diffracted light beams 33, 35, and 37 not satisfying the total reflection conditions get out of the light guide plate 43 and travels at an angle of 80° or more to the plane of the light guide plate 43.

Figure 9:
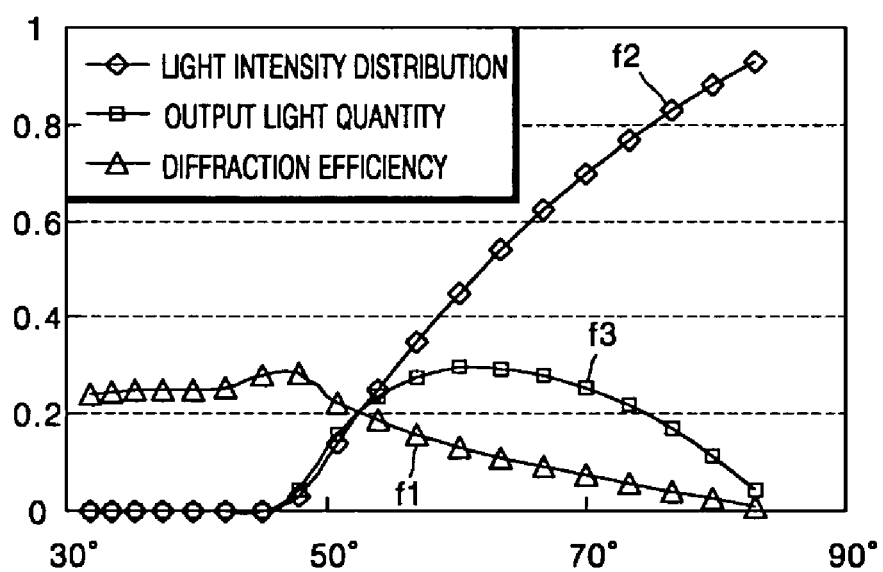
FIG. 9 is a graph showing the diffraction efficiency, light intensity distribution and output light quantity with respect to incidence angles of the flat backlight of FIG. 7.

FIG. 9 is a graph showing the diffraction efficiency f1, light intensity distribution f2, and output light quantity f3 with respect to incidence angles when the light guide plate of the flat backlight of FIG. 7 has a dot-patterned or rugged bottom surface with a grating interval of 440 nm and a grating depth of 0.25 nm. As shown in FIG. 9, the diffraction efficiency f1 remarkably decreases after the incidence angle reaches 50°, while the light intensity distribution f2 remarkably increases after the incidence angle reaches 50°. The output light quantity f3 of light output from a light guide plate corresponds to the product of the values of the two graphs f1 and f2, and has a maximum between 55° and 70°.

That is, in the backlight with no light path changing units, the diffraction efficiency of light is the lowest at the incidence angle of 90° where the light intensity is the highest, such that the output light quantity is generally lowered. However, the flat backlights having a light path changing unit, according to the first through sixth embodiments of the present invention, can reduce the loss of light intensity and increase the diffraction efficiency.

Figure 10A:
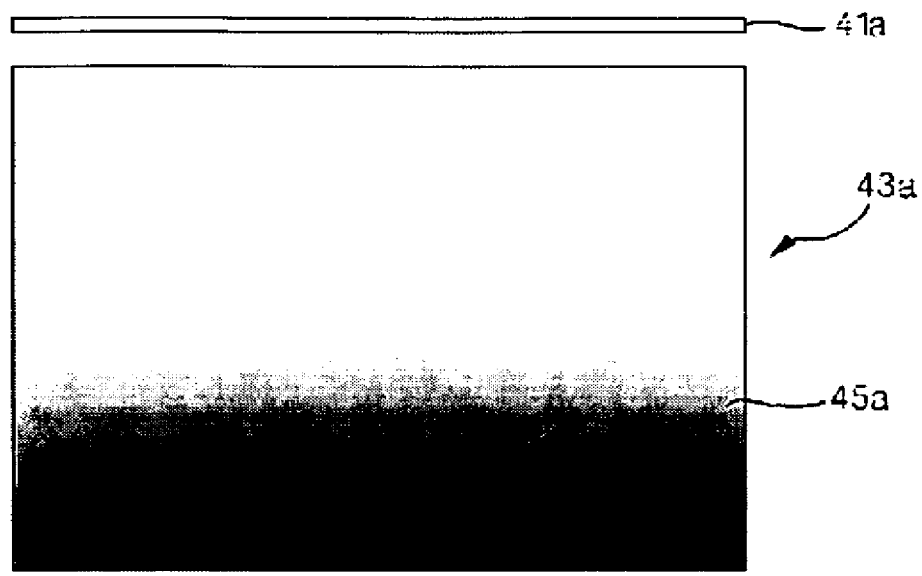
FIG. 10A shows a stripe-patterned planar hologram formed on a light guide plate in the backlight of FIG. 7.

FIG. 10A shows the pattern of a planar hologram 45a formed on a light guide plate 43a in a backlight with no light path changing units as described in FIG. 7. Referring to FIG. 10A, the planar hologram 45a has a stripe pattern. The stripes constituting the planar hologram 45a are consecutively arranged on the entire bottom surface of the light guide plate 43a.

In a flat backlight according to the present invention, when the diffraction efficiency of the planar hologram 45a is uniform over the light guide plate 43a, the planar hologram 45a becomes smaller as it approaches the light source 41a, and it becomes bigger as it becomes more distant from the light source 41a. Alternatively, the pattern of the planar hologram 45a becomes sparser as it approaches the light source 41a, and it becomes denser as it distances from the light source 41a.

If the light source 41a is located on the lateral side of the light guide plate 43a, the light intensity becomes higher as it approaches the light source 41a, and it becomes lower as it distances from the light source 41a.

Accordingly, in order to emit uniform light from the entire surface of the light guide plate 43a, it is preferable that planar holograms 45a with low diffraction efficiency are arranged in the direction approaching the light source 41a and planar holograms 45a with high diffraction efficiency are arranged in the direction distancing from the light source 41a. If the planar hologram 45a has uniform diffraction efficiency over the light guide plate 43a, it is preferable that the pattern of the planar holograms 45a becomes smaller as it approaches the light source 41a and becomes bigger as it distances from the light source 41a.

The striped-patterned planar hologram 45a can partially be formed on the light guide plate 43a. Preferably, the stripes of the display hologram 45a are periodically arranged. If the stripes of the display hologram 45a are not periodically arranged, light is not uniformly emitted from the planar hologram 45a, thus causing a degradation in the light efficiency of the entire backlight.

Figure 10B:
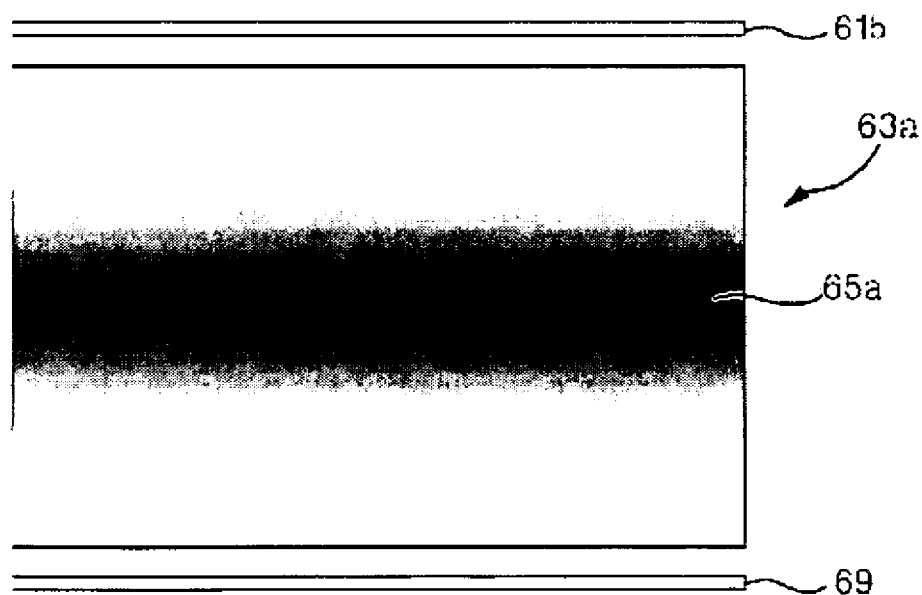
FIG. 10B shows a stripe-patterned planar hologram formed on a light guide plate in the backlight of FIG. 4A.

FIG. 10B shows the pattern of a planar hologram 65a formed on a light guide plate 63a in the flat backlights according to the first through fourth and sixth embodiments of the present invention. Referring to FIG. 10B, the pattern of the planar hologram 45a becomes sparser in the directions toward the light source 61 and the light path changing unit 69, and becomes denser in the direction toward the center of the light guide plate 63a.

As described above, the light intensity of the planar hologram 65a, near the light source 61 and the light path changing unit 69, is relatively higher than that of the planar hologram 65a at the center of the light guide plate 63a. Accordingly, in order to uniformly distribute the light intensity of light emitted from the light guide plate 63a over the entire surface of the light guide plate 63a, the diffraction efficiency of the planar hologram 65a is reduced in the directions toward the light source 61 and the light path changing unit 69, and it is increased in the direction toward the center of the light guide plate 63a.

Here, the pattern of the planar hologram 65a of FIG. 10B can be applied to the flat backlights according to the first through fourth embodiments and the sixth embodiment of the present invention. The grating interval and the grating depth, depending on the incidence angle providing the maximum diffraction efficiency, control the diffraction efficiency within a predetermined range. When a pattern having uniform diffraction efficiency is formed, a planar hologram with a small pattern is formed near the light source 61 and the light path changing unit 69, and a planar hologram with a large pattern is formed far from the light source 61 and the light path changing unit 69.

Figure 11A:
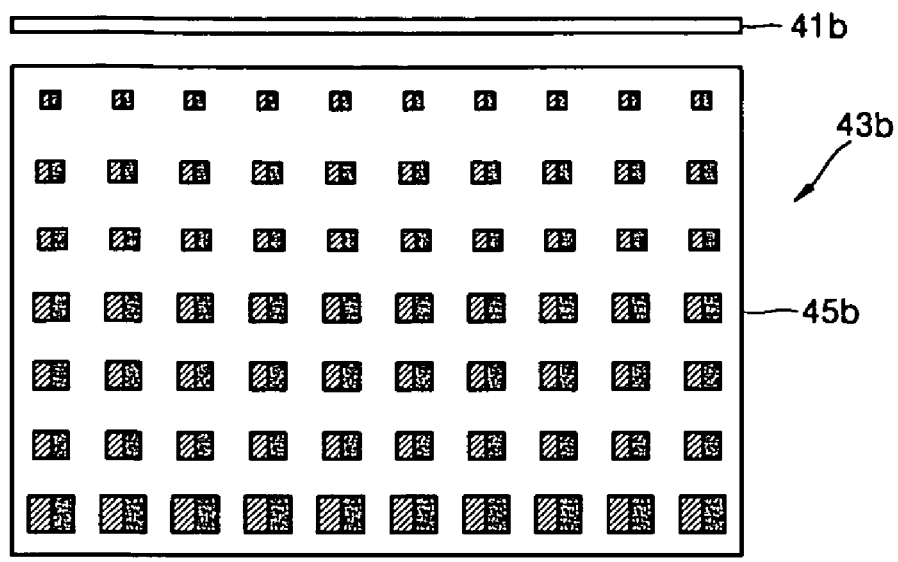
FIG. 11A shows a rectangle-patterned planar hologram formed on a light guide plate in the backlight of FIG. 7.

FIG. 11A shows a rectangle-patterned planar hologram 45b formed on a light guide plate 43b in the flat backlight with no light path changing units of FIG. 7. Referring to FIG. 11A, a planar holograms 45b formed on a light guide plate 43b is patterned with two types of rectangles having different grating intervals. As described above, the grating interval varies according to the wavelength of light.

The patterned rectangles of the planar hologram 45b become smaller in the direction toward the light source 41b, and they become larger in the direction distancing from the light source 41b.

When the diffracting direction varies according to the wavelength of light, the light intensity distribution depending on the angle varies according to the wavelength of light. This may cause a degradation in the quality of image. Accordingly, the impression of a color shown on a liquid crystal panel may vary. If the planar hologram 45b having the above-described grating interval is formed on the light guide plate 43b to make red light have the highest diffraction efficiency, the reproduced light may provide a stronger impression of red, which lowers the image quality.

Accordingly, the planar hologram 45b having at least two types of grating intervals can be provided in order to balance the impression of a color.

As described above referring to FIG. 11A, the planar hologram 45b can be patterned in one type of rectangles such that the red light is emitted forward, and in the other type of rectangles such that the blue light is emitted forward.

The grating interval satisfying Equation 2 is about 528 nm for red light ($\lambda$=800 nm), and about 474 nm for blue light ($\lambda$=405 nm). Thus, the use of the planar hologram 45b patterned with rectangles having the two types of grating intervals, i.e., 474 nm and 274 nm, can uniformly maintain the color impression of emitted light.

Figure 11B:
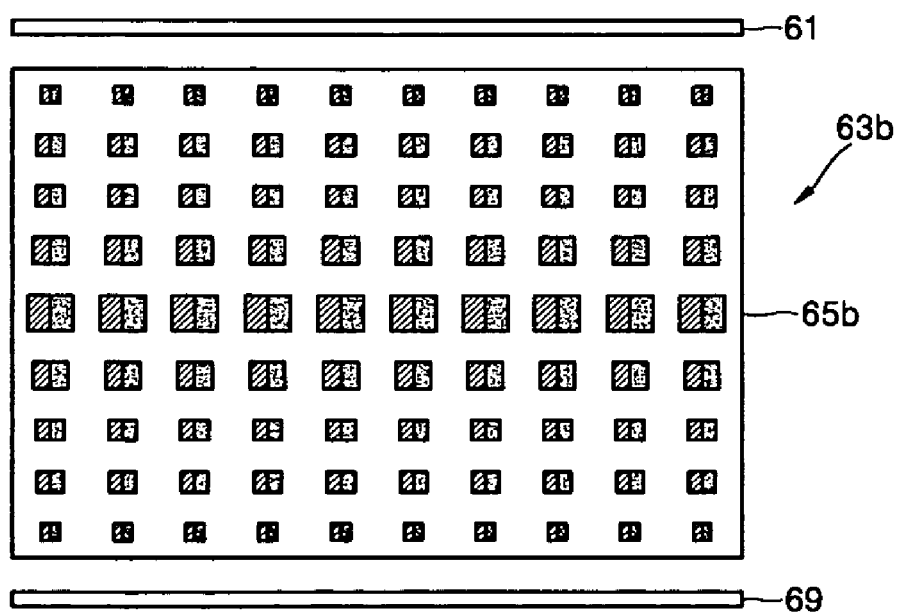
FIG. 11B shows a rectangle-patterned planar hologram formed on a light guide plate in the backlight of FIG. 4A.

The pattern for the planar hologram 65b of FIG. 11B is obtained by applying the pattern for the planar hologram 45b of FIG. 11A, and can be applied to the first through fourth and sixth embodiments of the present invention.

In FIG. 11B, the planar hologram 65b is patterned with rectangles having two types of grating intervals based on the wavelengths of light as in FIG. 11A. However, the planar hologram 65b is patterned so that the diffraction efficiency becomes lower in the directions from the center of the light guide plate 63b to both the light source 61 and the light path changing unit 69. Alternatively, when the diffraction efficiency is uniform over the entire surface of the light guide plate 63b, the planar hologram 65b is patterned with smaller rectangles in the directions from the center of the light guide plate 63b to both the light source 61 and the light path changing unit 69. Therefore, the color impression of output light can be uniformly maintained, and the light intensity of output light can be uniformly distributed over the entire surface of the light guide plate 63.

Alternatively, the planar hologram 65b can be patterned such that two types of rectangles have different diffraction efficiency depending on the wavelength of light by having different grating depths.

Figure 12A:
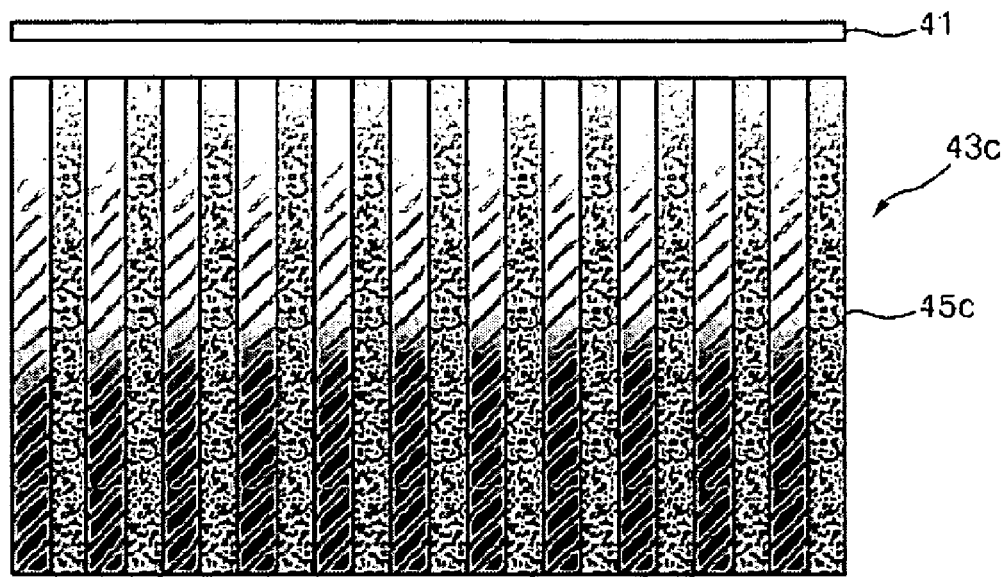
FIG. 12A shows a stripe-patterned planar hologram formed on a light guide plate in the backlight of FIG. 7.

FIG. 12A shows the pattern of a planar hologram 45c having two different periodical-shaped grating intervals formed on a light guide plate 43c in a backlight with no light path changing units according to the present invention. Referring to FIG. 12A, the planar hologram 45c is formed on the entire surface of the light guide plate 43c, such that the diffraction efficiency of light increases. This increases the probability that light is emitted from the light guide plate 43c. In addition, as described above, light having two different wavelengths can be output at an angle of 80° or more to the plane of the light guide plate 43c, such that the color impression of light reproduced on a liquid crystal panel is equalized, and that a uniform light intensity distribution is obtained. This leads to the improvement of image quality.

In a flat backlight having no light path changing units according to the present invention, the planar hologram 45 included on the light guide plate 43 can be patterned with periodical stripes having no less than two different grating intervals. Each of the grating intervals can have a width satisfying Equation 4, depending on the wavelength of light.

Figure 12B:
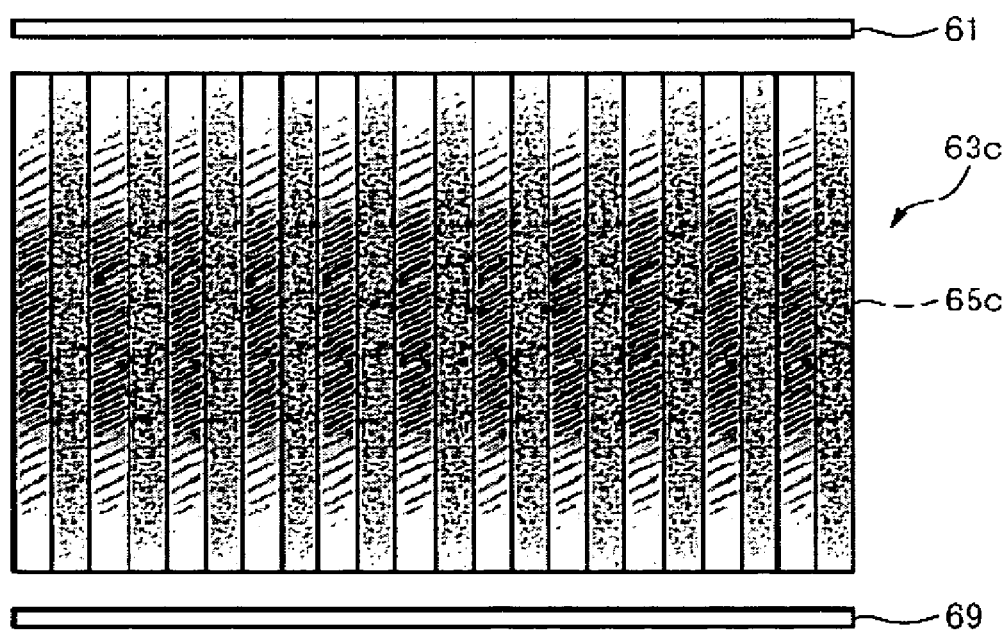
FIG. 12B shows a stripe-patterned planar hologram formed on a light guide plate in the backlight of FIG. 4A.

FIG. 12B shows the pattern of a planar hologram 65c formed on a light guide plate 63c in the backlights according to the first through fourth and sixth embodiments of the present invention. Referring to FIG. 12B, the diffraction efficiency of a planar hologram 65c becomes lower in the directions toward the light source 61 and the light path changing unit 69. Alternatively, when the diffraction efficiency is uniform over the surface of the light guide plate 63c, the pattern of the planar hologram 65c becomes smaller in the directions toward the light source 61 and the light path-changing unit 69. Each of the grating intervals is formed depending on the wavelength of light as shown in FIG. 12A, while the pattern of the planar hologram 65c has different densities over the surface of the light guide plate 63c. However, this configuration is essentially made to evenly distribute light intensity of output light over the entire surface of the light guide plate 63c, similar to the principle of patterning of the planar holograms used in the flat backlight having no light path changing units according to the present invention.

Figure 13:
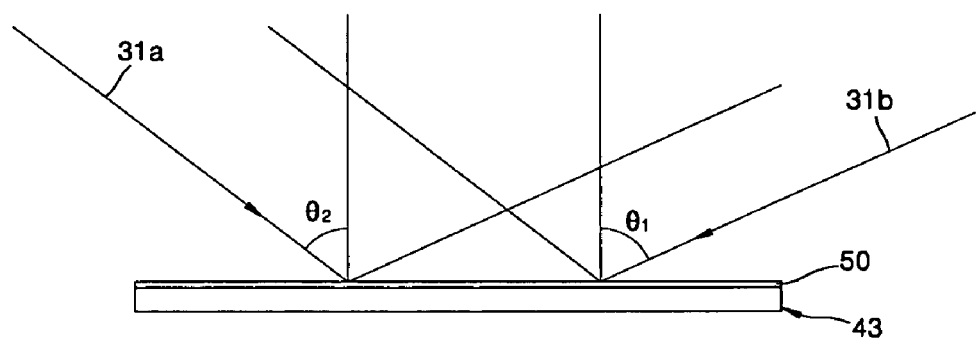
FIG. 13 schematically shows a method of forming a flat hologram used by a backlight for a flat display device according to the present invention.

Referring to FIG. 13, in order to form a planar hologram 45 on a light guide plate 43, first, the light guide plate 43 is coated with a photosensitive material 50. Two incident light beams 31a and 31b output from an identical light source are incident at angles $\Theta_1$ and $\Theta_2$ upon the light guide plate 43 coated with the photoresist 50, and interfere with each other. The interference between the two incident light beams 31a and 31b produces an interference pattern on the photoresist 50 of the light guide plate 43.

The incident light beams can be formed of a combination of a convergent light beam and a parallel light beam or a combination of the convergent light beam and a diffused light beam. The planar hologram 45, which is engraved according to the type of incident light beams, has a grating interval P according to Equation 5:

$$P = \lambda/(\sin\Theta_1 + \sin\Theta_2) \quad (5)$$

wherein the grating interval P is set to be 2 μm or less.

The planar hologram 45 can be obtained by developing or chemically treating the interference pattern using a standard process for the photoresist 50. The planar hologram 45 can be mass-produced through reproduction by stamping. Alternatively, the planar hologram 45 can be formed by exposing the light guide plate 43 to light using a mask.

In FIG. 13, if a volume hologram material such as dichromated gelatin or silver halide is used as the photoresist, a volume hologram may be obtained. However, the present invention refers to a planar hologram. A planar hologram is easily mass-produced using the above-described method, and provides a high environmental reliability in duplicates.

A planar hologram 45 having a uniform grating interval according to an embodiment of the present invention is manufactured by the interference between two parallel light beams. In addition, a planar hologram 45 having a gradually varying grating internal can be manufactured by changing the angle made by two light beams using a convergent light beam or a parallel light beam.

Figure 14:
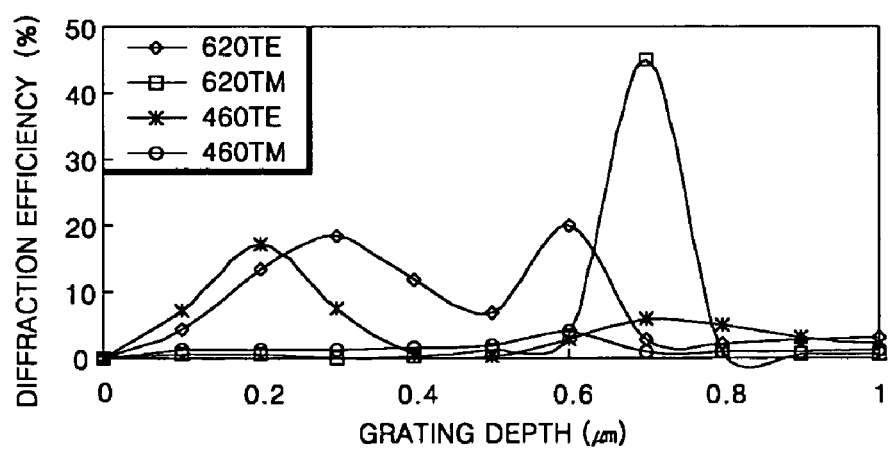
FIG. 14 is a graph showing the diffraction efficiency of P-polarized light and S-polarized light according to the depths of the grating of a planar hologram when light with a 460 nm wavelength and light with a 620 nm wavelength are incident upon a planar hologram with a grating interval of 440 nm.

FIG. 14 is a graph showing the diffraction efficiency of P-polarized light and S-polarized light according to the depths of the grating of a planar hologram when blue light with a 460 nm wavelength and red light with a 620 nm wavelength are incident upon a planar hologram 45 with a grating interval of 440 nm. Here, the P-polarized light is indicated by transverse magnetic light (TM) and the S-polarized light is indicated by transverse electric light (TE). Accordingly, P-polarized light with a 460 nm wavelength is indicated by 460TM, S-polarized light with a 460 nm wavelength is indicated by 460TE, P-polarized light with a 620 nm wavelength is indicated by 620TM, and S-polarized light with a 620 nm wavelength is indicated by 620TE.

As shown in FIG. 14, the diffraction efficiency of light 620TE has a maximum of about 20% at 0.3 μm and 0.6 μm grating depths, and the diffraction efficiency of light 620TM has a maximum of about 50% at a 0.7 μm grating depth. It is known that each of the light 460TE and the light 460TM has a diffraction efficiency of less than 10%.

When both a 620 nm light beam and a 460 nm light beam are incident upon the flat hologram 45 with a 440 nm grating interval and a grating depth of about 0.25 μmm, only polarized light TE is usually output because polarized light TE has a significantly high diffraction efficiency. Accordingly, specific polarized light can be strengthened.

A lighting system for emitting only specific polarized light with high efficiency increases the light intensity of output light by reducing a light loss. Hence, such a lighting system can be useful in a display device using polarization.

Figure 15A:
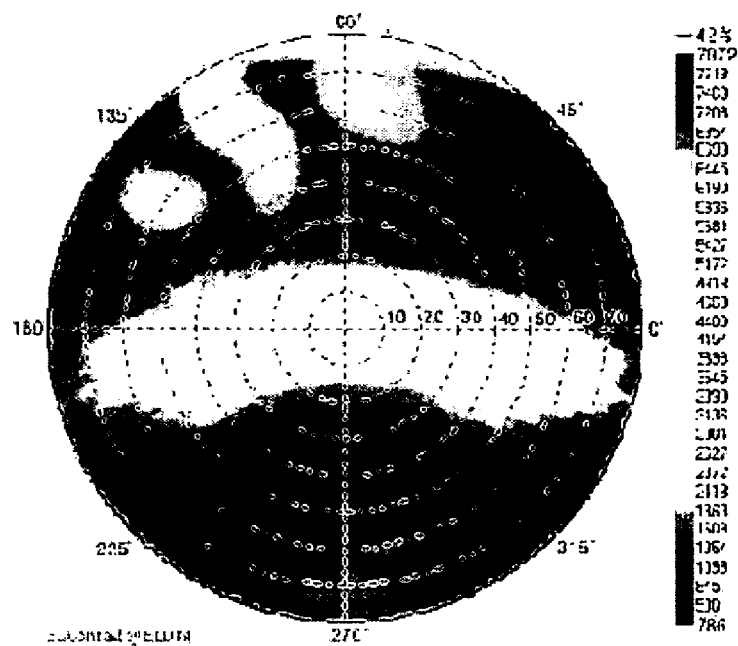
FIG. 15A shows the light intensity distribution of light transmitted by a light guide plate in the backlight of FIG. 7.
Figure 15B:
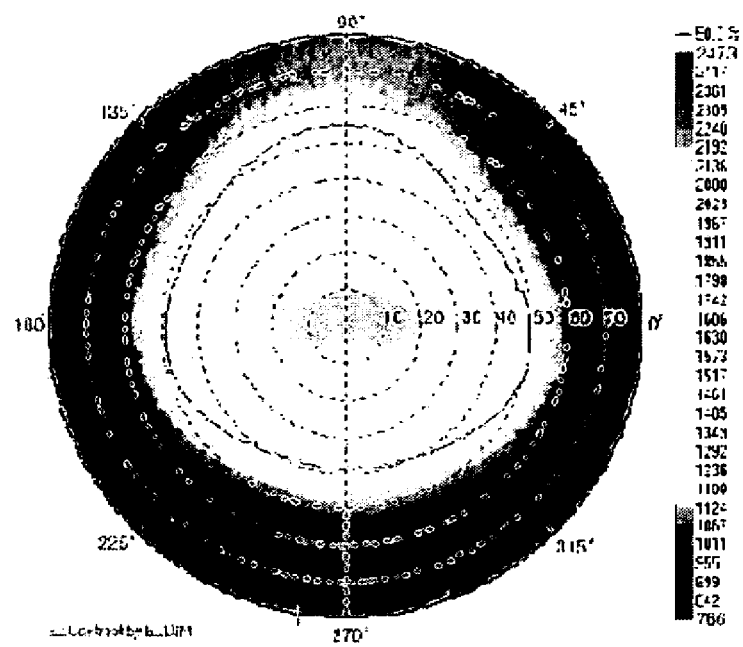
FIG. 15B shows the light intensity distribution of final light transmitted by a diffusion plate in the backlight of FIG. 7.

The effects of such a lighting system according to the present invention can be known from FIGS. 15A and 15B. FIG. 15A shows the light intensity distribution of light transmitted by the light guide plate 43 in the backlight with no light path changing unit according to the present invention. A light intensity of no less than 4,000 cd is distributed along the horizontal axis 0°-180°. The light intensity at the center of the light guide plate 43 is about 4,600 cd, and the other areas of the light guide plate 43 have light intensity of no more than 1,600 cd.

FIG. 15B shows the light intensity distribution of final light transmitted by a diffusion plate 49 through the light guide plate 43 in the backlight of FIG. 7. Referring to FIG. 15B, the asymmetrical structure of FIG. 15A is changed into a nearly symmetrical structure. The light intensity moves toward the vertical axis 90°-270° to form a circle around the center of the light guide plate 43. This leads to uniform distribution of light. Here, the light intensity at the center of the light guide plate 43 is about 2,400 cd.

It can be confirmed from FIGS. 15A and 15B that light can be vertically output by using a light guide plate and a diffusion plate without using a prismatic plate.

In a backlight according to preferred embodiments of the present invention, a planar hologram formed on a light guide plate enables light to be output at an angle nearly perpendicular to the light guide plate. That is, as the light efficiency can be increased just by using a planar hologram, a backlight according to the present invention can be manufactured in a simple structure requiring no prismatic plates.

Flat backlights according to preferred embodiments of the present invention provide a maximum diffraction efficiency by making the most of the incident light with a high light intensity. In addition, the flat backlights according to the present invention increase luminance and reduce light loss by uniformly distributing light intensity over the entire surface of a light guide plate. Therefore, backlights of good performances are provided.

As described above, a flat backlight according to the present invention can reduce a light loss and increase the light intensity of output light by adopting a light path changing unit to maximally diffract incident light having a maximum light intensity.

Also, a flat backlight according to the present invention can emit light nearly vertically by periodically patterning a planar hologram, such that it can be manufactured in a simple structure providing a high luminous efficiency.

In addition, a flat backlight according to the present invention can increase the diffraction efficiency of specific polarized light by controlling the depth of grating formed on a planar hologram.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A backlight for a flat display device comprising:
    a visible light source;
    a light guide plate installed at one side of the light source, in which light from the light source travels while being totally reflected;
    a planar hologram formed on at least one surface of the light guide plate, the planar hologram having a pattern of a predetermined grating interval and a predetermined grating depth in order to diffract light at a predetermined angle toward the light guide plate; and
    a light path changing unit installed at one side of the light guide plate, the light path changing unit changing the path of light traveling in the light guide plate to make light incident upon the planar hologram at an angle near the angle providing the maximum diffraction efficiency.

2. The backlight for a flat display device of claim 1, further comprising a reflecting plate installed on the rear side of the light guide plate, the reflecting plate reflecting light diffracted by the planar hologram and sending the diffracted light back to the light guide plate.

3. The backlight for a flat display device of claim 1 or 2, wherein the light path changing unit is a reflective mirror that is located opposite to the light source and inclined at a predetermined angle.

4. The backlight for a flat display device of claim 1 or 2, wherein the light path changing unit is a reflective surface of the light guide plate, the reflective surface being located opposite to the light source and inclined at a predetermined angle.

5. The backlight for a flat display device of claim 1 or 2, wherein the light path changing unit is a refracting element installed between the light source and the light guide plate or installed opposite to the side of the light guide plate where the light source is installed.

6. The backlight for a flat display device of claim 5, wherein the refracting element is a refractive lens.

7. The backlight for a flat display device of claim 5, wherein the refracting element is a refractive grating.

8. The backlight for a flat display device of claim 1 or 2, wherein the diffraction efficiency of the planar hologram becomes lower toward the light path changing unit.

9. The backlight for a flat display device of claim 1 or 2, wherein the pattern of the planar hologram becomes smaller toward the light path changing unit.

10. The backlight for a flat display device of claim 7, wherein the grating interval of the planar hologram is 2 gm or less.

11. The backlight for a flat display device of claim 9, wherein the grating interval of the planar hologram is no greater than 2 μm.

12. The backlight for a flat display device of claim 8, wherein the grating interval of the planar hologram is composed of at least two types of grating intervals depending on the wavelength of light.

13. The backlight for a flat display device of claim 9, wherein the grating interval of the planar hologram is composed of at least two types of grating intervals depending on the wavelength of light.

14. The backlight for a flat display device of claim 1 or 2, wherein the grating depth of the planar hologram is set so that the diffraction efficiency ratio of two polarized light beams that meet each other at a right angle is no less than 1.5.

15. The backlight for a flat display device of claim 1 or 2, further comprising a diffusion plate installed on the entire surface of the light guide plate to diffuse light emitted from the light guide plate.

16. The backlight for a flat display device of claim 1, wherein said visible light source is a white light source.

17. The backlight for a flat display device of claim 1, wherein said backlight is free of any prismatic plates.

18. The backlight for a flat display device of claim 8, wherein the grating interval of the planar hologram is 2 gm or less.

* * * * *